United States Patent
Chatterjee et al.

(10) Patent No.: US 9,495,370 B1
(45) Date of Patent: Nov. 15, 2016

(54) DATA RECOVERY POINT REVIEW IN A CONTINUOUS DATA PROTECTION SYSTEM

(75) Inventors: Paresh Chatterjee, Fremont, CA (US); Anandh Mahalingam, Fremont, CA (US); Raja Jayaraman, Fremont, CA (US); Jomy Maliakal, Newark, CA (US)

(73) Assignee: American Megatrends, Inc., Norcross, GA (US)

( * ) Notice: Subject to any disclaimer, the term of this patent is extended or adjusted under 35 U.S.C. 154(b) by 670 days.

(21) Appl. No.: 12/173,203

(22) Filed: Jul. 15, 2008

Related U.S. Application Data

(60) Provisional application No. 60/950,651, filed on Jul. 19, 2007, provisional application No. 60/950,660, filed on Jul. 19, 2007.

(51) Int. Cl.
*G06F 7/00* (2006.01)
*G06F 17/30* (2006.01)
*G06F 11/14* (2006.01)

(52) U.S. Cl.
CPC ..... *G06F 17/30088* (2013.01); *G06F 11/1451* (2013.01)

(58) Field of Classification Search
CPC ............ G06F 11/1456; G06F 17/30575; G06F 17/30185; G06F 17/30088; G06F 11/1446; G06F 11/1451
USPC .......... 707/674, 682–684, 999.204, 999.202, 707/202, 999.008, 610
See application file for complete search history.

(56) References Cited

U.S. PATENT DOCUMENTS

| | | | |
|---|---|---|---|
| 4,942,579 A | | 7/1990 | Goodlander et al. |
| 5,257,367 A | | 10/1993 | Goodlander et al. |
| 5,287,501 A | * | 2/1994 | Lomet .......................... 707/648 |
| 5,414,840 A | * | 5/1995 | Rengarajan et al. |
| 5,530,850 A | | 6/1996 | Ford et al. |
| 5,701,480 A | * | 12/1997 | Raz .............................. 718/101 |
| 5,720,027 A | | 2/1998 | Sarkozy et al. |
| 5,732,238 A | | 3/1998 | Sarkozy |
| 5,790,774 A | | 8/1998 | Sarkozy |
| 5,893,919 A | | 4/1999 | Sarkozy et al. |

(Continued)

OTHER PUBLICATIONS

US 6,988,220, 01/2006, Eng et al. (withdrawn)
(Continued)

*Primary Examiner* — James Trujillo
*Assistant Examiner* — John J Morris
(74) *Attorney, Agent, or Firm* — Meunier Carlin & Curfman LLC

(57) ABSTRACT

Technologies for providing recovery point review within a continuous data protection system can support a data storage operator in a data recovery procedure. A snapshot image can be chosen that was made prior to a data loss event. A new writable snapshot can be created from this logged snapshot. The new writeable snapshot can become the target for recovering the data volume. Review can be performed in a forward direction by reading a journal of I/O operations that have occurred since the prior snapshot was made. Review can be performed in a backward direction by deriving a dirty data list of changes made to the data volume and then removing the changes as requested. The operator can continue forward and backward review operations to refine the selected recovery point. Upon establishing the desired recovery point, the new writable snapshot can be committed, or rolled back, onto the data storage volume.

14 Claims, 8 Drawing Sheets

(56) References Cited

U.S. PATENT DOCUMENTS

| | | | |
|---|---|---|---|
| 5,974,426 A | 10/1999 | Lee et al. | |
| 6,098,128 A | 8/2000 | Velez-McCaskey et al. | |
| 6,247,023 B1* | 6/2001 | Hsiao et al. | |
| 6,298,425 B1 | 10/2001 | Whitaker et al. | |
| 6,434,681 B1 | 8/2002 | Armangau | |
| 6,460,054 B1 | 10/2002 | Grummon | |
| 6,892,211 B2 | 5/2005 | Hitz et al. | |
| 7,039,661 B1* | 5/2006 | Ranade | 707/648 |
| 7,072,916 B1 | 7/2006 | Lewis et al. | |
| 7,100,089 B1 | 8/2006 | Phelps | |
| 7,111,026 B2 | 9/2006 | Sato | |
| 7,340,645 B1* | 3/2008 | Martin et al. | 714/15 |
| 7,373,366 B1 | 5/2008 | Chatterjee et al. | |
| 7,401,093 B1* | 7/2008 | Hamilton | G06F 17/30088 |
| 7,467,165 B2* | 12/2008 | Okada et al. | |
| 7,536,529 B1 | 5/2009 | Chatterjee et al. | |
| 7,549,027 B1* | 6/2009 | McAndrews et al. | 711/161 |
| 7,565,661 B2* | 7/2009 | Sim-Tang | 719/318 |
| 7,571,350 B2* | 8/2009 | Ninose et al. | 714/20 |
| 7,581,136 B2* | 8/2009 | Osaki | 714/20 |
| 7,587,431 B1* | 9/2009 | Rao et al. | |
| 7,624,133 B1* | 11/2009 | Ojalvo | |
| 7,698,320 B2* | 4/2010 | Tokuda et al. | 707/674 |
| 7,844,643 B2 | 11/2010 | Judd | |
| 7,885,938 B1 | 2/2011 | Greene et al. | |
| 8,117,162 B2 | 2/2012 | Haselton et al. | |
| 2002/0161983 A1 | 10/2002 | Milos et al. | |
| 2003/0163630 A1 | 8/2003 | Aasheim et al. | |
| 2004/0030727 A1 | 2/2004 | Armangau et al. | |
| 2004/0107226 A1* | 6/2004 | Autrey et al. | 707/204 |
| 2004/0128470 A1 | 7/2004 | Hetzler et al. | |
| 2004/0139128 A1* | 7/2004 | Becker et al. | 707/204 |
| 2004/0268067 A1* | 12/2004 | Yamagami | 711/159 |
| 2005/0182797 A1* | 8/2005 | Adkins et al. | 707/200 |
| 2005/0182953 A1* | 8/2005 | Stager et al. | 713/189 |
| 2006/0218364 A1 | 9/2006 | Kitamura | |
| 2007/0143366 A1 | 6/2007 | D'Souza et al. | |
| 2007/0220309 A1 | 9/2007 | Andre et al. | |
| 2007/0233756 A1 | 10/2007 | D'Souza et al. | |
| 2007/0244938 A1* | 10/2007 | Michael et al. | 707/204 |
| 2007/0245107 A1* | 10/2007 | Kano | 711/163 |
| 2007/0276878 A1 | 11/2007 | Zheng et al. | |
| 2007/0282921 A1* | 12/2007 | Atluri et al. | 707/202 |
| 2008/0091744 A1* | 4/2008 | Shitomi et al. | 707/204 |
| 2008/0208927 A1 | 8/2008 | Chikusa et al. | |
| 2009/0182784 A1 | 7/2009 | Rohit et al. | |
| 2009/0182959 A1 | 7/2009 | Rao | |
| 2009/0327357 A1 | 12/2009 | Beglin et al. | |

OTHER PUBLICATIONS

Pradhan, D.K.; Vaidya, N.H.; , "Roll-forward checkpointing scheme: a novel fault-tolerant architecture," Computers, IEEE Transactions on , vol. 43, No. 10, pp. 1163-1174, Oct. 1994doi: 10.1109/12.324542 URL: http://ieeexplore.ieee.org/stamp/stamp.jsp?tp=&arnumber=324542&isnumber=7726.*

U.S. Appl. No. 11/254,347, filed Oct. 20, 2005 entitled "Method, System, Apparatus, and Computer-Readable Medium for Provisioning Space in a Data Storage System," Inventors: Chatterjee et al.

U.S. Official Action dated Sep. 4, 2007 in U.S. Appl. No. 11/254,347.

U.S. Official Action dated Mar. 18, 2008 in U.S. Appl. No. 11/254,347.

U.S. Appl. No. 11/255,146, filed Oct. 20, 2005, entitled Method, System, Apparatus, and Computer-Readable Medium for Taking and Managing Snapshots of a Storage Volume, Inventors: Chatterjee et al.

U.S. Official Action dated Aug. 4, 2006 in U.S. Appl. No. 11/255,146.

U.S. Official Action dated Nov. 17, 2006 in U.S. Appl. No. 11/255,146.

U.S. Official Action dated Aug. 22, 2007 in U.S. Appl. No. 11/255,146.

U.S. Notice of Allowance / Allowability dated Dec. 11, 2007 in U.S. Appl. No. 11/255,146.

U.S. Appl. No. 12/042,705, filed Mar. 5, 2008 entitled "Method, System, Apparatus, and Computer-Readable Medium for Taking and Managing Snapshots of a Storage Volume," Inventors: Chatterjee et al.

U.S. Appl. No. 12/042,710, filed Mar. 5, 2008 entitled "Method, System, Apparatus, and Computer-Readable Medium for Taking and Managing Snapshots of a Storage Volume," Inventors: Chatterjee et al.

U.S. Appl. No. 12/042,715, filed Mar. 5, 2008 entitled "Method, System, Apparatus, and Computer-Readable Medium for Taking and Managing Snapshots of a Storage Volume," Inventors: Chatterjee et al.

Peterson et al. "Ext3cow: A Time-Shifting File System for Regulatory Compliance," ACM Transactions on Storage, vol. 1, No. 2, May 2005, pp. 190-212.

U.S. Appl. No. 12/013,099, filed Jan. 11, 2008 entitled "Storage System Snapshots for Continuous File Protection," Inventors: Chatterjee et al.

U.S. Appl. No. 12/104,129, filed Apr. 16, 2008 entitled "Low Latency Synchronous Replication Using an N-Way Router," Inventors: Chatterjee et al.

U.S. Appl. No. 12/173,188, filed Jul. 15, 2008 entitled "Continuous Data Protection Journaling in Data Storage Systems," Inventors: Chatterjee et al.

U.S. Appl. No. 12/425,123, filed Apr. 16, 2008 entitled "Provisioning Space in a Data Storage System", Inventors: Chatterjee et al.

U.S. Official Action dated Oct. 8, 2008 in U.S. Appl. No. 11/254,347.

U.S. Notice of Allowance/Allowability dated Jan. 12, 2009 in U.S. Appl. No. 11/254,347.

Douglis et al., "Log-Structured File Systems," IEEE, 1989, pp. 124-129.

Green et al., "Designing a Fast, On-line Backup System for a Log-Structured File System," Digital Technical Journal, vol. 8, No. 2, 1996, pp. 32-45.

Rosenblum et al., "The Design and Implementation of a Log-Structured File System," ACM Transactions on Computer Systems, vol. 10, No. 1, Feb. 1992, pp. 26-52.

U.S. Official Action, dated Dec. 23, 2011, received in connection with related U.S. Appl. No. 12/472,858.

\* cited by examiner

DATA RECOVERY POINT REVIEW IN A CONTINUOUS DATA PROTECTION SYSTEM

CROSS-REFERENCE TO RELATED APPLICATIONS

This application claims the benefit of U.S. provisional patent application No. 60/950,651, filed on Jul. 19, 2007, entitled "Protecting Data Continuously in Storage Systems," and U.S. provisional patent application No. 60/950,660, filed on Jul. 19, 2007, entitled "Novel Method of Reviewing Recovery Points in a CDP System," both of which are expressly incorporated herein by reference in their entirety.

BACKGROUND

Data storage and integrity are important components of information age business operations. Enterprises are increasingly moving towards data protection and disaster recovery strategies to prepare for, and recover from, data loss disasters. While some risks to stored data are physical and tangible (for example, failure of a disk drive, fire, or floods), other dangers are intangible or logical (for example, accidental deletion of files, or an attack by a computer virus). Data must be protected from the first category of dangers through physical means, such as remote replication, Redundant Arrays of Inexpensive Disks (RAID), highly-available systems, tape backups, and such.

The second category of inadvertent erasure or modification of data is traditionally mitigated through various approaches. For example, solutions may employ file versioning, tape backups, or periodic backup to a remote server. Many of these solutions are periodic, meaning that they may be executed once a day or even less frequently. As such, when data needs to be recovered, there is a data loss that could be as high as the data created during the time period between two backups.

Requirements to protect against loss of data, along with various regulatory compliance requirements, are driving the move towards solutions involving Continuous Data Protection (CDP). According to the Storage Networking Industry Association's (SNIA) CDP Special Interest Group, CDP is a "methodology that continuously captures or tracks data modifications and stores changes independently of the primary data, enabling recovery points from any point in the past. CDP systems may be block, file or application based and can provide fine granularities of restorable objects to infinitely variable recovery points." Such a definition implies three primary aspects to a CDP implementation. First is the ability to track and capture data. Second is the ability to rollback to any point in the history of the volume. Third is the ability to store captured data in a location external to the main data.

At the time of rolling back a CDP system, a system operator generally considers the protected data in order to establish a recovery point. Generally, a desired recovery point is very close to the time of a data loss or storage disaster, yet strictly before the loss event so as to ensure data integrity. The operator may wish to perform a recovery review, stepping back and forth to different history points around the time of data loss. In a traditional CDP system, the operator is generally restricted to reviewing in only one direction. This direction is typically the backwards direction and if forward review is desired, the operator may have to recreate the copy of the volume and restart the review process. This procedure does not afford quick and efficient scanning backward and forward through the protected data to find the desired recovery point Thus, the preferred recovery point for rolling back the volume may not be readily obtainable in a traditional CDP system.

It is with respect to these considerations and others that the disclosure made herein is presented.

SUMMARY

Technologies are described herein for reviewing data recovery points associated with a CDP system. Review can be performed in a forward direction by reading a journal, or redo log, of new writes that have occurred since a full snapshot was made of a data storage volume. Review can be performed in a backward direction by deriving a dirty data list of changes made to the data volume and then removing the changes as requested.

According to one embodiment, a snapshot can be chosen that is close in time, but prior to, the data loss being recovered from. A new writable snapshot can be created from this chosen snapshot. The new writeable snapshot can become the target for recovering the volume. The journal of write operations can also store snapshot events in chronological order with the logged data writes. Thus, examining the journal can provide a pointer within the journal of where the chosen snapshot was created. The new writeable snapshot may be advanced forward through the history of the volume by applying write operations from the journal. The write operations can start from the pointer to the snapshot creation and continue forward to a first desired review point. This application of journal entries as a redo log can be controlled up to a single I/O granularity.

According to another embodiment, the write operations read from the journal during forward review may also be maintained in memory as a journal header list. This header list can provide a chronological order of write operations that were targeted to the volume. A backward review can be performed by referencing the header list in memory and overwriting the dirty writes on the writable snapshot with original data from the chosen snapshot and the journal.

According to yet another embodiment, an operator can continue the forward and backward review operations to refine the selected recovery point. Upon establishing the desired recovery point, the new writable snapshot can be committed, or rolled back, onto the volume. Using an efficient snapshot technology, the recovery time from mounting the previous snapshot and playing back the operations from the journal may be extremely fast. Such a system can provide excellent recovery point objective (RPO) performance as well as excellent recovery time objective (RTO) performance. This performance may reduce the cost associated with downtime and can provide considerable improvement over traditional CDP approaches.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter.

Furthermore, the claimed subject matter is not limited to implementations that solve any or all disadvantages noted in any part of this disclosure.

DETAILED DESCRIPTION

Figure 1:
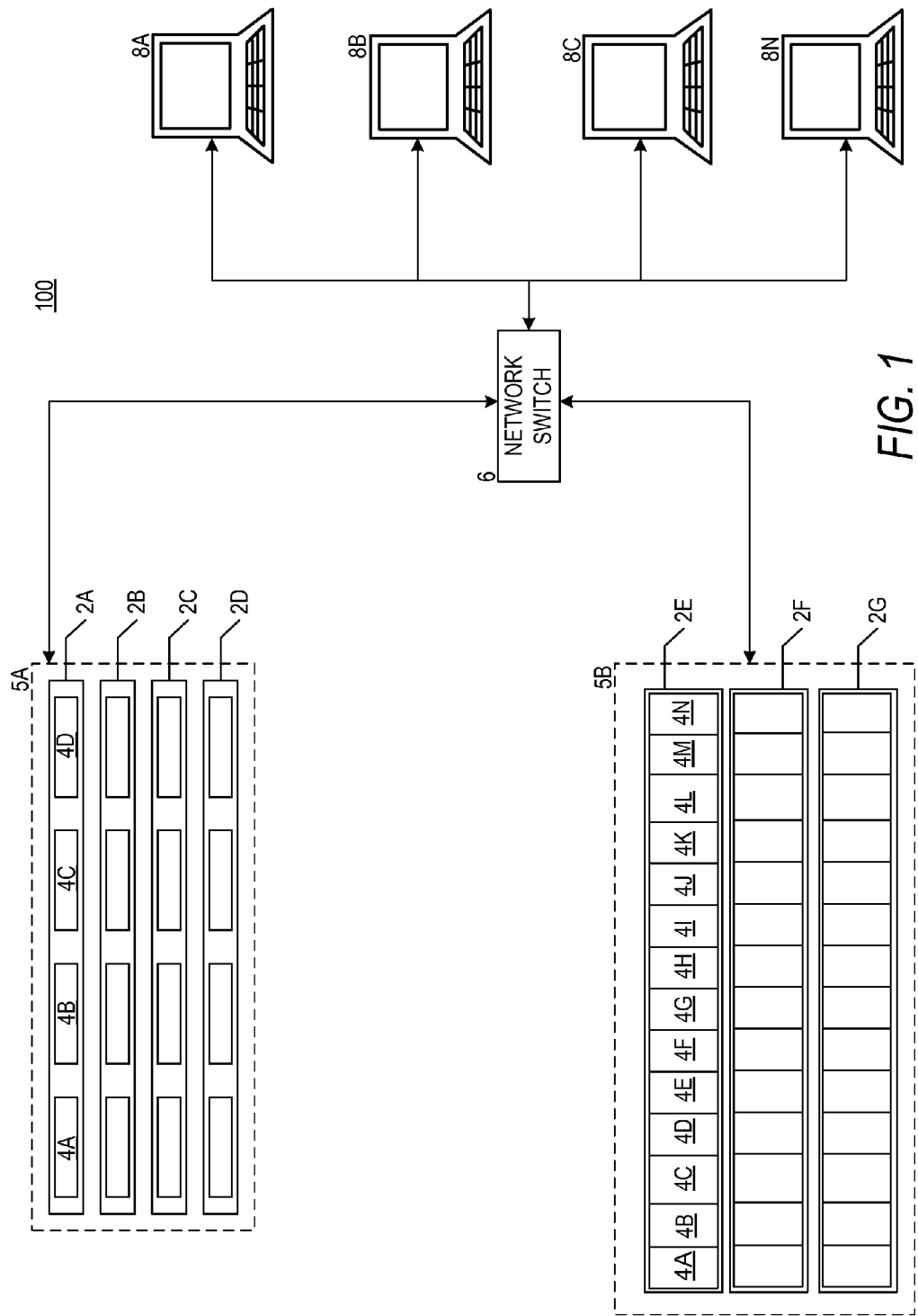
FIG. 1 is a network architecture diagram illustrating aspects of a storage system according to one exemplary embodiment.

The following detailed description is directed to technologies for providing continuous data protection using a journal to log storage operations and snapshot events. Through the use of the embodiments presented herein, continuous data protection may be provided in storage systems using logged write operations to rebuild storage volumes from a storage snapshot created prior to the desired recovery point.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for continuous data protection using storage volume snapshots will be described.

Turning now to FIG. 1, details will be provided regarding an illustrative operating environment for the implementations presented herein, as well as aspects of several software components that provide the functionality described herein for continuous data protection. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B include the storage server computers 2A-2G (also referred to herein as "storage nodes" or a "node") that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D. Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Storage volume snapshots and continuous data protection features may be provided on one or more storage server computers 2A-2G, one or more storage clusters 5A-5B, or one or more client computers 8A-8N. Furthermore, the processes for implementing CDP or snapshots for CDP may execute on any of these systems or may operate in a distributed fashion with components executing across two or more of these systems.

Figure 2:
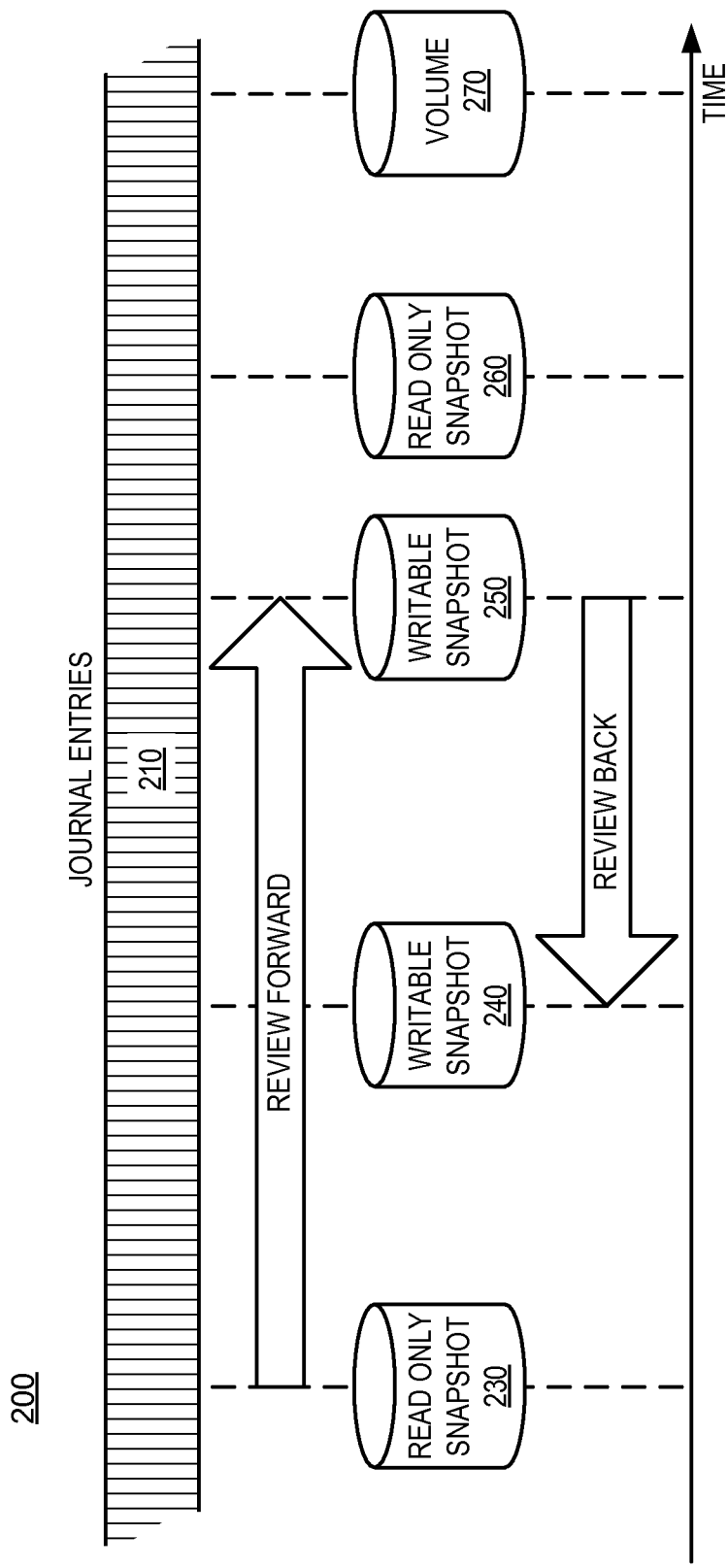
FIG. 2 is a recovery review timeline illustrating journal entries of storage operations and snapshot events according to one exemplary embodiment.

Referring now to FIG. 2, a timeline 200 illustrates journal entries 210 of storage operations and snapshot events according to one exemplary embodiment. I/O operations received at a storage system can be logged as journal entries 210 as a CDP mechanism. Such a journal may be considered a "redo log" as it can be used to replay previous storage writes during recover processes as discussed herein. In addition to logging I/O operations as journal entries 210, snapshot events 230, 260 may also be logged. The inclusion of snapshot events in the journal can simplify and significantly accelerate the loss recovery process for a CDP system.

Snapshots may be taken of a data storage volume using an efficient technique that requires little, or no, performance overhead. The snapshot technique may also support the creation of writable snapshots 240, 250 as well as quickly rolling a volume 270 back to an earlier snapshot. The volume 270 can be the most recent, and currently operational, version of the data store. In the snapshot system, a linked list can be maintained for each logical unit of allocation in a data storage volume. Such an allocation unit of the storage system may be referred to as a provision. The linked list can contain nodes, each of which can correspond to a particular snapshot lifetime in which the provision was written. A snapshot lifetime can be equated to the period of time that a particular snapshot is active. Each snapshot lifetime may be uniquely associated with a sequence number that identifies the snapshot lifetime. Each node in the linked list can include a data field for storing the sequence number for the provision, a pointer to the next node in the linked list, and a bitmap for storing data identifying each of the sub-portions, or chunks, of the provision that were written to during the snapshot lifetime of the provision. The bitmap is utilized for a variety of purposes, including determining the particular provision that should be utilized to fetch data for a read request. Deleting a snapshot or rolling back a volume 270 to a previous snapshot may be accomplished by quickly manipulating the contents of the linked list.

The linked list data structure can support read-only snapshots 230, 260 and can also support the creation of writable snapshots 240, 250. A new node can be added to the linked list whenever a write request is received for the corresponding logical provision for the first time during a given snapshot lifetime. When a request is received to read from a logical provision, the linked list can be traversed to locate the node in the list having the highest sequence number and also having valid data for the requested portion of the provision. This process can identify the latest version of that provision. Valid data can be indicated by the contents of the bitmap. Once the appropriate node has been located, the data can be read from the physical location corresponding to the located node of the linked list.

At recovery time, an operator can examine the journal using a visual recovery tool. The operator can identify the desired point for recovery. The operations discussed herein can assist the operator in determining the point in history to roll the volume 270 back to. A writable snapshot 250 can be created for advancing forward from a prior read only snapshot 230. A writable snapshot 240 can also be created for reviewing back through the history of the journal entries 210. Such forward and backward reviewing can support the operator zeroing in upon, or refining, the desired recovery point.

Review may be done in the forward direction by reading the redo log from the journal and playing it onto a writeable snapshot 250 of a volume 270. Logs can be read from the journal just after the original read only snapshot 230 and played into the writeable snapshot 250. This can proceed up to the point where the operator has requested review. At the end of such a redo log play back operation, the writeable snapshot 250 may be an exact copy of the original volume at the point in time expected by the operator. If the operator of the CDP system is not satisfied with a recovery point, they can move forward or backward quite easily. This redo log playback can be controlled up to a single I/O granularity. During a forward review, the redo logs read from the journal may also be maintained in memory. This can provide a chronological order of I/O operations that occurred on the volume after the snapshot.

For a backward review, logs can be undone from the writeable snapshot 250 by referencing the logs in memory and then overwriting the dirty writes with original data from the read-only snapshot and the log. Thus, a new version of the writeable snapshot 240 can be generated. The method of reading and writing the logs can be done in parallel, thereby reducing the time taken for presenting a review image. Finally, the recovery can be committed by rolling back the reviewed image onto the volume 270. This can be done by rolling back the writeable snapshot 240, 250 onto the volume 270. Using the snapshot system discussed above, the roll back can be performed in a substantially reduced amount of time. This efficiency can significantly reduce the RTO of the CDP system.

Figure 3:
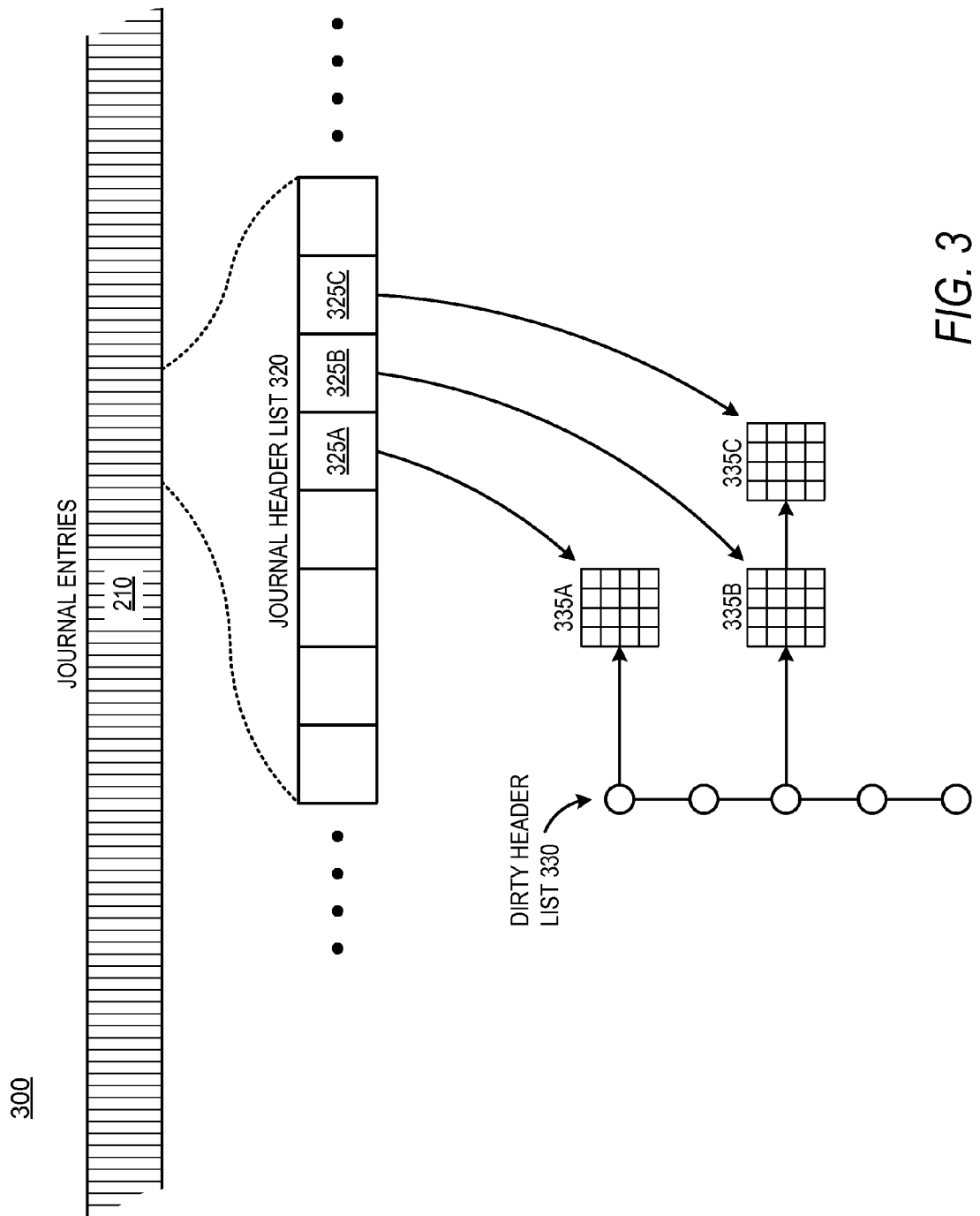
FIG. 3 is a data structure diagram illustrating journal entries, journal headers, and dirty header entries according to one exemplary embodiment.

Turning now to FIG. 3, a data structure diagram illustrates journal entries 210, a journal header list 320, and a dirty header list 330 according to one exemplary embodiment. While the journal entries 210 are read out to play forward onto the writeable snapshot 250 as discussed with respect to FIG. 2, the same I/O operations from the journal can be buffered in memory to a journal header list 320. Only information pertaining to the I/O operations, without the actual data, may need to be stored in the journal header list 320. This information may include the volume to which each I/O operation belonged to, a logical block address within the volume, and the I/O write size. After a forward review, the writeable snapshot 250 can be equivalent to the volume 270 as it existed at the recovery point specified by the operator. Using the journal header list 320 that has been buffered to memory, a backward review may be performed. For the backward review, the most recent write I/O operations performed on the writeable snapshot 250 can be removed back to the desired point of writable snapshot 240 as specified by the operator.

A dirty header list 330 can be generated be traversing through the journal header list 320 backwards from the last review point up to the new desired review point. As each of the nodes 325A-325C of the journal header list 320 is examined during the reverse traversal, a corresponding node 335A-335C can be entered into the dirty header list 330. The nodes 335A-335C of the dirty header list 330 can represent a bitmap of a chunk with the bits representing I/O operations at a sector granularity. The nodes 335A-335C of the dirty header list 330 can store information such as a logical LBA (chunk number) for the node, a sector-level bitmap for the entire chunk, and a bit level index to the journal header list 320.

The dirty header list 330 can be are maintained as a hashed list. For example, according to FIG. 3, node 335A can be stored in the first bucket of the hash list, while nodes 335B and 335C can both be assigned to the third bucket of the hash. As the journal header list 320 is traversed in reverse, each element, such as 325A-325C, can be examined. During this examination, if a matching node is not already represented in the dirty header list 330, a new node can be created for the dirty header list 330 and placed into the correct hashing bucket. The chunk number can be assigned to the node by aligning the logical LBA to the chunk size.

Sectors corresponding to the specific I/O operations encountered can be marked as dirty within the dirty header list 330 entry by setting them to an initialized value. For example, the value of negative one (−1) may be used. When the journal header list 320 is traversed in reverse completely from the previous review point to the new review point, the dirty header list can have nodes representing each I/O operation at the sector level that occurred between these two review points. These are the sectors that can be reverted to get the forward writeable snapshot 250 reverted back to the reverse writable snapshot 240. This reverse review process is discussed in additional detail with respect to FIG. 6 and FIG. 7.

Figure 4:
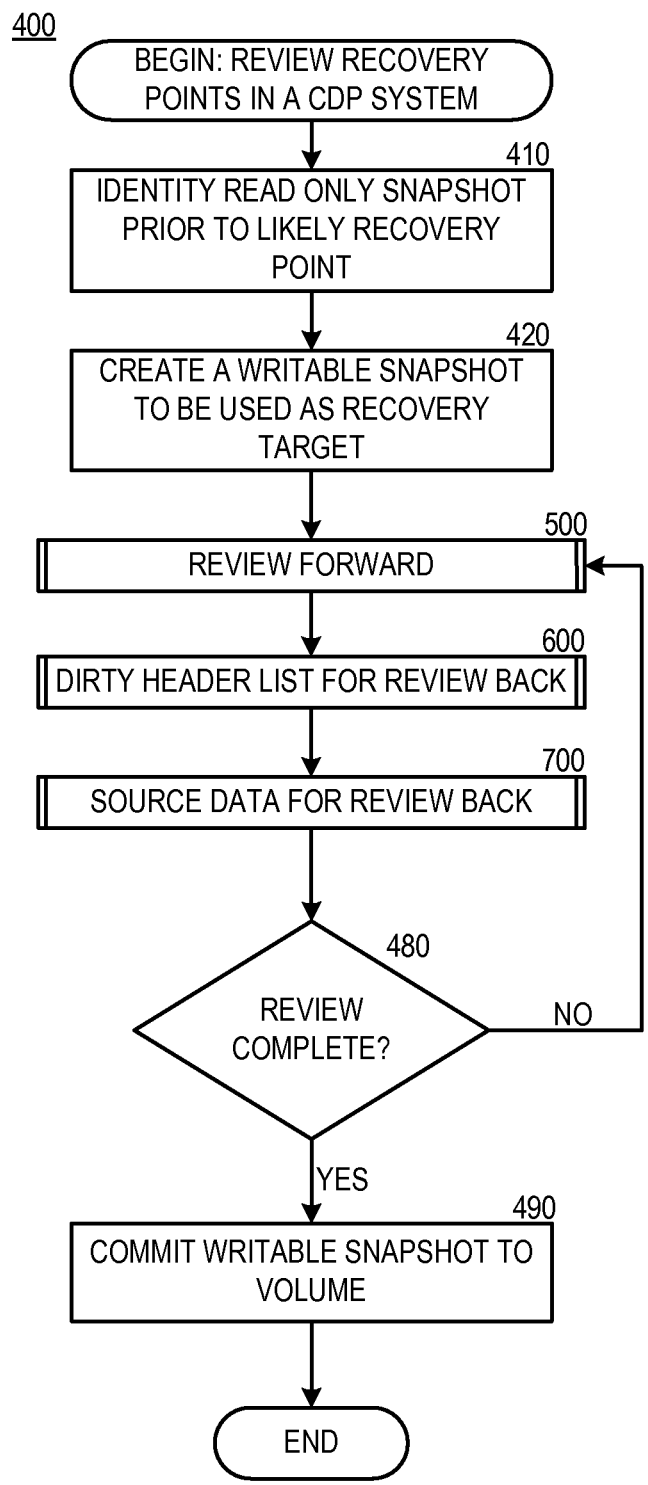
FIG. 4 is a logical flow diagram illustrating a process for reviewing recovery points in a CDP system according to one exemplary embodiment.

Turning now to FIG. 4, additional details will be provided regarding the embodiments presented herein for recovery point review in a continuous data protection system. In particular, FIG. 4 is a flow diagram showing a routine 400 that illustrates aspects of a process for reviewing recovery points in a CDP system according to one exemplary embodiment. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 400 can begin with operation 410 where a snapshot prior to the desired recovery point can be identified. The prior snapshot can be identified by searching backwards through the journal entries 210 from the desired recovery point until a snapshot creation event is reached. At operation 420, a writable snapshot can be created based upon the read only snapshot 230 that was identified in operation 410. This writeable snapshot 250 can be used as the target of the recovery process.

Next routine 500 can be used to review forward through the journal entries 210. Similarly, routines 600 and 700 can be used to review backwards through the journal entries 210. The forward and back review processes can be iterated to support the operator refining the actual desired recovery point within the history stored in the journal entries 210.

Operation 480 can determine if the operator's review process is complete. If the review is not complete, the routine 400 can loop back to routine 500 to continue the refinement of the recovery point. If the review is complete, then the routine 400 can continue from operation 480 to operation 490 where the current volume 270 can be rolled back to the writable snapshot 240, 250 that has been rebuilt by the iterative application of routines 500, 600, and 700. After operation 490, the routine 400 can terminate.

Figure 5:
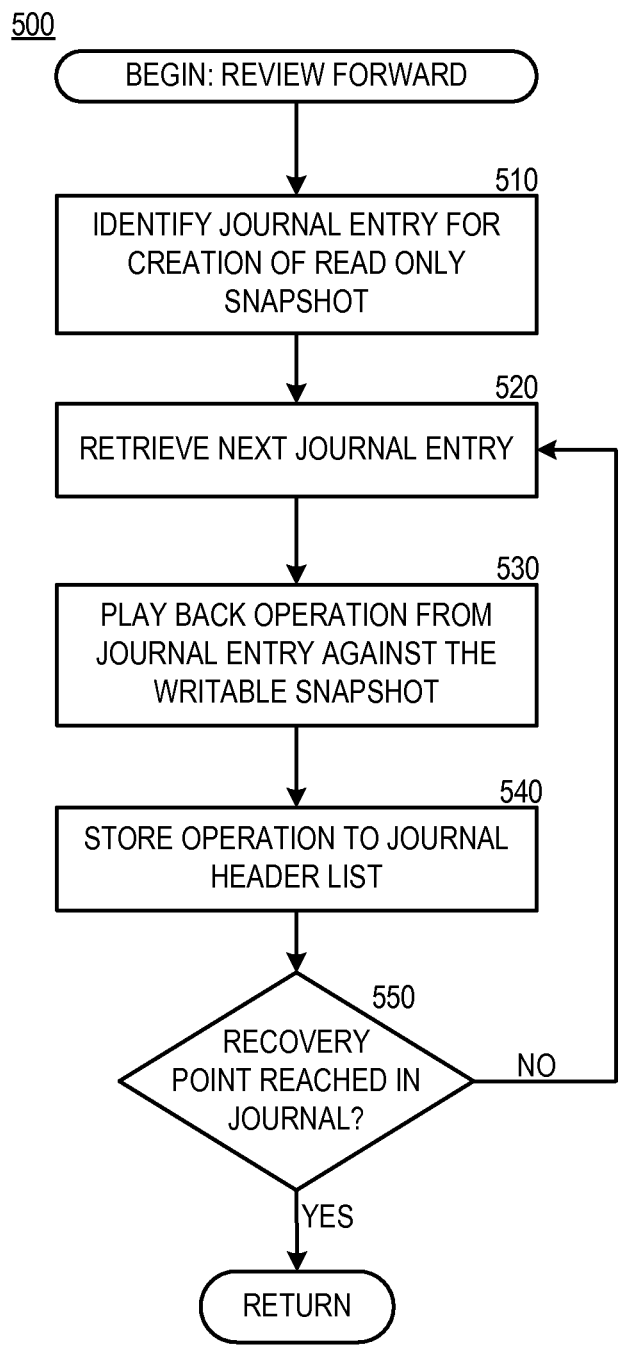
FIG. 5 is a logical flow diagram illustrating a process for reviewing forward in a CDP recovery procedure according to one exemplary embodiment.

Turning now to FIG. 5, additional details will be provided regarding the embodiments presented herein for recovery point review in a continuous data protection system. In particular, FIG. 5 is a flow diagram illustrating a routine 500 that shows aspects of a process for reviewing forward in a CDP recovery procedure according to one exemplary embodiment. The routine 500 can begin with operation 510 where the journal entry can be identified that recorded the creation of the read only snapshot 230 that was identified in operation 410. The journal entries 210 in the logging journal between this snapshot event 230 and the desired recover point may be used to restore, or redo, the writeable snapshot 250 up to the desired recovery point.

At operation 520, the next journal entry 210 from the identified point can be retrieved. At operation 530, the I/O operation recorded in the next journal entry 210 retrieved at operation 520 can be played back from the journal onto the writeable snapshot 250. At operation 540, the I/O operation played back in operation 530 can also be stored to a journal header list 320. The actual data of the I/O need not be stored into the journal header list 320.

At operation 550, it is determined if the next journal entry 210 has reached the desired recovery point within the journal. If the desired recovery point has not yet been reached, the routine 500 can loop back to operation 520 where the next journal entry 210 can be retrieved for playback. If instead, it is determined at operation 550 that the desired recovery point has been reached, the routine 500 can return.

Figure 6:
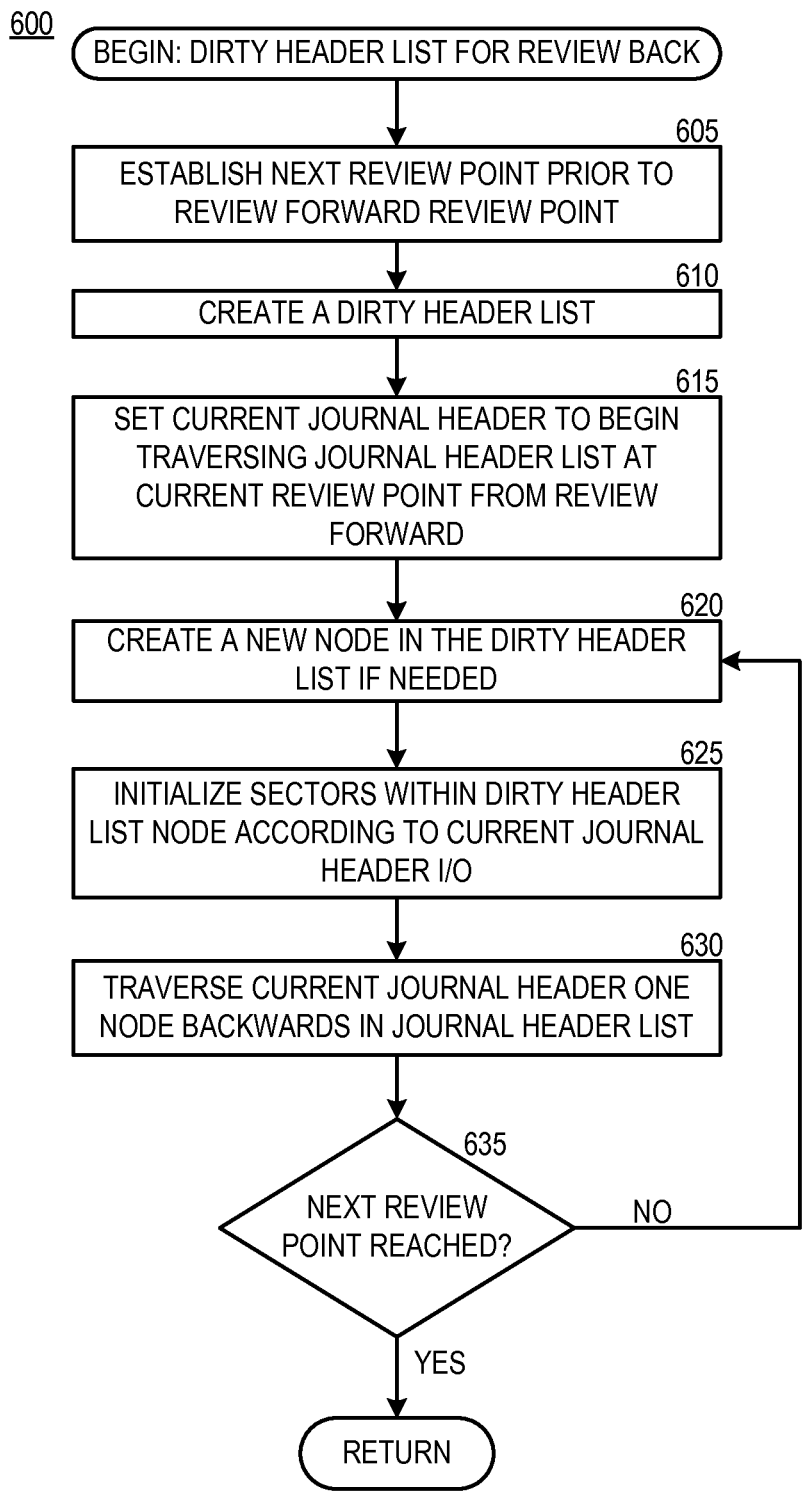
FIG. 6 is a logical flow diagram illustrating a process for dirty list generation while reviewing backward in a CDP recovery procedure according to one exemplary embodiment.

Turning now to FIG. 6, additional details will be provided regarding the embodiments presented herein for recovery point review in a continuous data protection system. In particular, FIG. 6 is a flow diagram illustrating a routine 600 that shows aspects of a process for dirty list generation while reviewing backward in a CDP recovery procedure according to one exemplary embodiment. The routine 600 can begin with operation 605 where the reverse, or backward, review procedure begins by establishing a next review point that is prior in time than the current review point. At operation 610, a dirty header list 330 can be prepared.

At operation 615, the current review point is set as the current journal header list 320 entry to begin the reverse traversal of the journal header list 320. The current review point may be the last review point from the previous forward review procedure 500.

At operation 620, a new node in the dirty header list 330 is created if needed. If there is not already an entry in the dirty header list 330 corresponding to the chunk associated with the current journal header list 320 entry, then a new dirty header list 330 entry is created. If there is already an entry in the dirty header list 330 corresponding to the current journal header list 320 entry, then the existing dirty header list 330 node may be used instead. The chunk number for the dirty header list 330 entry can be assigned by aligning the logical LBA to chunk size. Eventually, there can be one node in the dirty header list 330 list for each of the entry in the journal header list 320 between the last review point and the next review point. The entries in the dirty header list 330 can represent bitmaps I/O operations on a chunk at a sector granularity. The entries in the dirty header list 330 can be stored in a hash list where multiple nodes can be assigned to a given hash bucket according to a hash function. The same hash function can be used for retrieval from the hash to rapidly eliminate all other buckets from the retrieval search.

At operation 625, sectors corresponding to the I/O operations stored in the current journal header list 320 entry can be marked as dirty in the dirty header list 330 entry corresponding to the chunk associated with the locations of the I/O operations. The sector designators can be marked as dirty by setting them to an initialization value. For example, this value may be negative one (−1) or any other unique marker value.

At operation 630, the current journal header list 320 entry can be traversed one node backwards within the journal header list 320. At operation 635, it is determined if the traversal of operation 630 has reached the next review point or not. If the next review point has not been reached, the routine 600 can loop back to operation 620 where the next journal header list 320 entry is processed to the dirty header list 330 as discussed above. If instead, it is determined at operation 635 that the next review point has been reached, the routine 600 can return.

Figure 7:
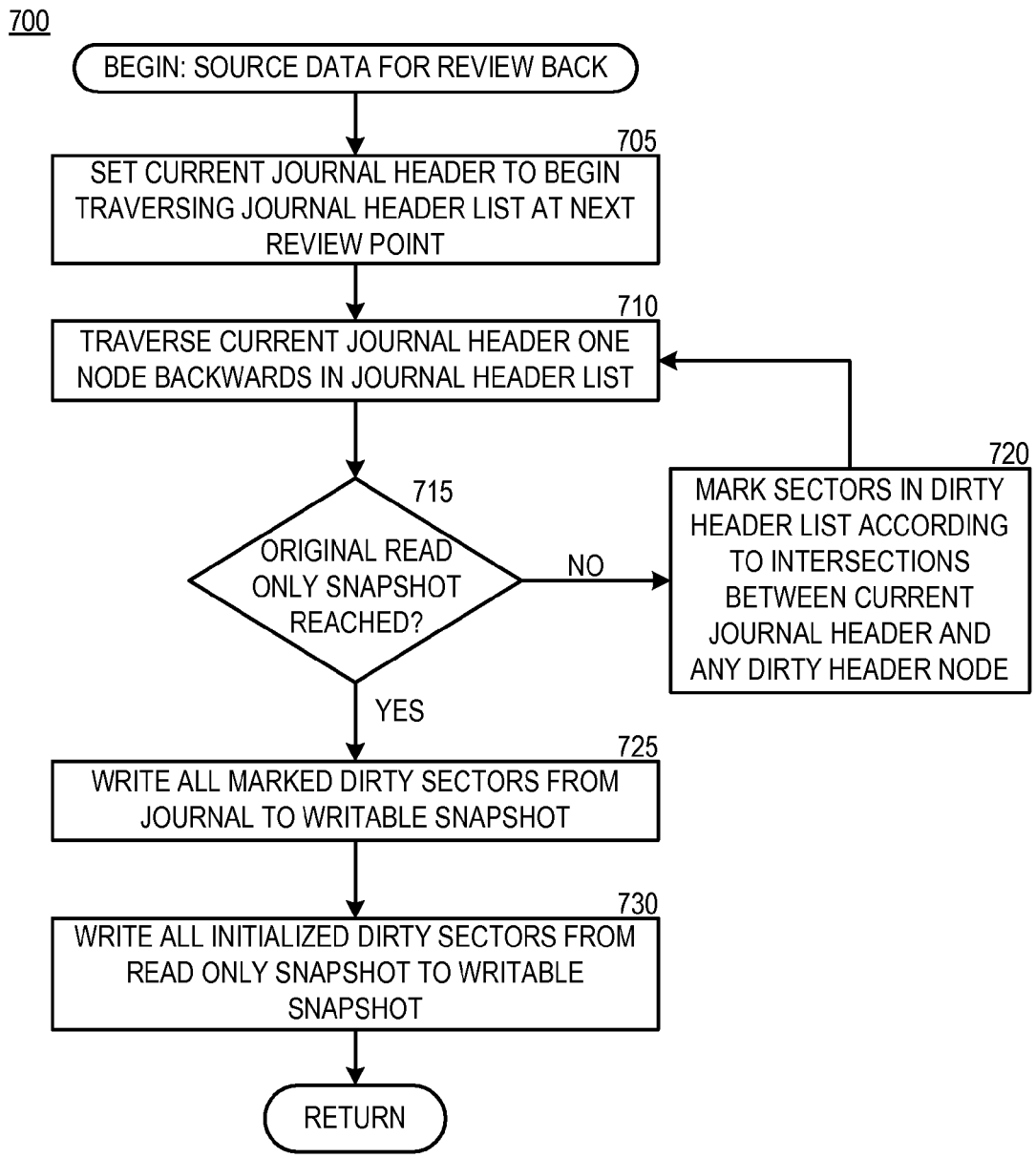
FIG. 7 is a logical flow diagram illustrating a process for sourcing data while reviewing backward in a CDP recovery procedure according to one exemplary embodiment.

Turning now to FIG. 7, additional details will be provided regarding the embodiments presented herein for recovery point review in a continuous data protection system. In particular, FIG. 7 is a flow diagram illustrating a routine 700 that shows aspects of a process for sourcing data while reviewing backward in a CDP recovery procedure according to one exemplary embodiment. In routine 600, all of the sectors that were written between the next reverse review point and the current review point were marked in the dirty header list 330. In routine 700, each of these dirty sectors can be associated with source data for setting them back to the values corresponding to the new review point. Some of the dirty sectors may be set all the way back to the previous read only snapshot 230, but other may have been modified after the read only snapshot 230 but before the next review point. Routine 700 can traverse back across this range of operations in the journal entries 210 to determine if the correct review point data may need to come from an I/O in the journal or from the read only snapshot 230.

The routine 700 can begin with operation 705 where the current journal header list 320 entry is set to the next review point. At operation 710, the current journal header list 320 entry can be traversed back one step in the journal header list 320. At operation 715, it can be determined if the original read only snapshot 230 has been reached or not. If the read only snapshot 230 has not been reached yet, the routine 700 can continue to operation 720. At operation 720, the I/O operation in the current journal header list 320 entry can be checked for intersections with any of the dirty sectors marked in the dirty header list 330. If an I/O intersects with a dirty sector in a node, the data represented by the current I/O is the data needed to update the writeable snapshot 240 to the next review point. To denote this, the journal header list 320 array index for the current entry may be stored in the corresponding dirty header list 330 entry in place of the initialization value that may have been, for example, negative one. During this mapping, if there is an I/O intersection on a sector, but the sector already has an index mapped, the sector has been modified more than once. Since the journal is being traversed in reverse, the first encountered data write to a sector is the latest data and thus will be used for the reverse review.

If it was determined at operation 715 that the original read only snapshot 230 has been reached, the routine 700 can continue to operation 725. At such a time, the dirty header list 330 can represent all the sectors that need to be replaced along with mappings to their source data for replacement data. The sectors identified with an index correspond to the most recently valid data in the journal entries 210. In operation 725, all the marked dirty sectors on the writable snapshot 250 can be written with data from the journal entries 210. Similarly, the sectors retaining the initialization value marking, for example a value of negative one, represent data that was not modified between the original read only snapshot 230 and the next review point. Thus, replacement data will be sourced from the read only snapshot 230. In operation 730, the dirty sectors marked with the initialization value can be written on the writable snapshot 250 from the original read only snapshot 230.

The writes performed in operation 725 and operation 730 can be set off concurrently. Since each node represents a unique chunk of data in the volume, the reads and writes can be done in parallel. This can reduce the time required for completion of the review process. After all write I/Os from operations 725 and 730 complete, the writeable snapshot 250 can represent the next review point as requested by the operator. As such, routine 700 may return.

Figure 8:
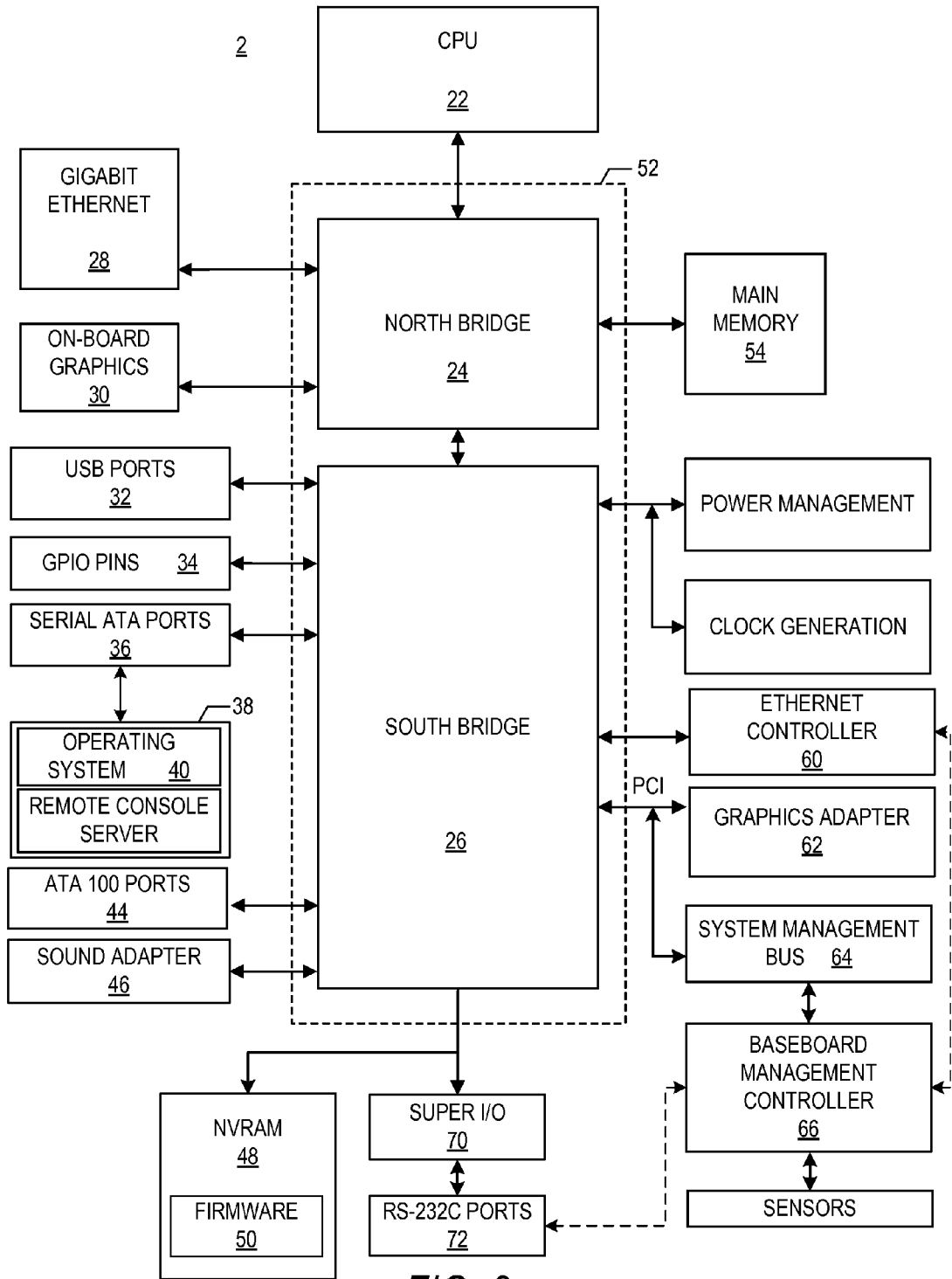
FIG. 8 is a computer architecture diagram illustrating a computer hardware architecture for a computing system capable of continuous data protection according to one exemplary embodiment.

FIG. 8 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including handheld devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 8 shows an illustrative computer architecture for a storage server computer 2 that may be utilized in the implementations described herein. Such an illustrative computer system may also describe a client computer system 8A-8N. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38.

As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 8, may include other components that are not explicitly shown in FIG. 8, or may utilize an architecture completely different than that shown in FIG. 8.

Based on the foregoing, it should be appreciated that technologies for reviewing recovery points in a continuous data protection system are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for reviewing recovery points in a continuous data protection system, the method comprising:
    associating a journal of logged write operations with a data volume;
    identifying a snapshot of the data volume within the journal;
    creating a recovery snapshot based on the identified snapshot;
    reviewing the recovery snapshot forward through the journal, the forward review comprising applying the logged write operations from the journal to the recovery snapshot from a pointer within the journal of where the recovery snapshot was created forward to a recovery point and buffering in memory a journal header list from the logged write operations, the journal header list storing information in the memory pertaining to the logged write operations without the content of the logged write operations;
    creating a dirty header list from the journal header list, the dirty header list comprising one or more nodes, each of the nodes representing a bitmap for tracking one or more dirty sectors of a chunk of the data volume;
    reviewing the recovery snapshot backwards through the journal after reviewing the recovery snapshot forward through the journal by referencing the dirty header list and overwriting dirty writes on the recovery snapshot with data from the identified snapshot and the journal;
    iterating the forward and the backward reviews to refine the recovery point associated with the recovery snapshot; and
    committing the recovery snapshot to the data volume.

2. The method of claim 1, wherein reviewing the recovery snapshot forward comprises playing operations from the journal onto the recovery snapshot.

3. The method of claim 1, wherein reviewing the recovery snapshot backwards comprises restoring prior data up to an earlier recovery point onto the recovery snapshot.

4. The method of claim 3, wherein marking dirty sector indicators comprises identifying replacement source data for each dirty sector as one of an entry in the journal and a corresponding sector in the identified snapshot.

5. The method of claim 3, further comprising restoring dirty sectors onto the recovery snapshot as parallel I/O operations.

6. A non-transitory computer storage medium having computer-executable instructions stored thereon which, when executed by a computer system, cause the computer system to:
    associate a journal of logged write operations with a data volume;
    identify a snapshot of the data volume within the journal;
    create a recovery snapshot based on the identified snapshot;
    review the recovery snapshot forward through the journal, the forward review comprising applying the logged write operations from the journal to the recovery snapshot from a pointer within the journal of where the recovery snapshot was created forward to a recovery point and buffering in memory a journal header list from the logged write operations, the journal header list storing information in the memory pertaining to the logged write operations without the content of the logged write operations;
    create a dirty header list from the journal header list, the dirty header list comprising one or more nodes, each of the nodes representing a bitmap for tracking one or more dirty sectors of a chunk of the data volume;
    review the recovery snapshot backwards through the journal after reviewing the recovery snapshot forward through the journal by referencing the dirty header list and overwriting dirty writes on the recovery snapshot with data from the identified snapshot and the journal;
    iterate the forward and the backward reviews to refine the recovery point associated with the recovery snapshot; and
    commit the recovery snapshot to the data volume.

7. The non-transitory computer storage medium of claim 6, wherein reviewing the recovery snapshot forward comprises playing operations from the journal onto the recovery snapshot.

8. The non-transitory computer storage medium of claim 6, wherein reviewing the recovery snapshot backwards comprises restoring prior data up to an earlier recovery point onto the recovery snapshot.

9. The non-transitory computer storage medium of claim 8, wherein marking dirty sector indicators comprises identifying replacement source data for each dirty sector as one of an entry in the journal and a corresponding sector in the identified snapshot.

10. The non-transitory computer storage medium of claim 8, further comprising computer-executable instructions which cause the computer system to restore dirty sectors onto the recovery snapshot as parallel I/O operations.

11. A continuous data protection system comprising:
a storage server;
a storage volume associated with storage server;
a journal associated with the storage server;
a processing unit associated with the storage server;
and one or more modules that are executed on the processing unit, being configured to:
identify a snapshot of the storage volume within the journal,
create a recovery snapshot based on the identified snapshot,
review the recovery snapshot forward through the journal, the forward review comprising applying logged write operations from the journal to the recovery snapshot from a pointer within the journal of where the recovery snapshot was created forward to a recovery point and buffering in memory a journal header list from the logged write operations, the journal header list storing information in the memory pertaining to the logged write operations without the content of the logged write operations,
create a dirty header list from the journal header list, the dirty header list comprising one or more nodes, each of the nodes representing a bitmap for tracking one or more dirty sectors of a chunk of the storage volume,
review the recovery snapshot backwards through the journal after reviewing the recovery snapshot forward through the journal by referencing the dirty header list and overwriting dirty writes on the recovery snapshot with data from the identified snapshot and the journal, and
iterate the forward and the backward reviews to refine the recovery point associated with the recovery snapshot.

12. The system claim 11, wherein reviewing the recovery snapshot forward comprises playing operations from the journal onto the recovery snapshot.

13. The system of claim 11, wherein reviewing the recovery snapshot backwards comprises restoring prior data up to an earlier recovery point onto the recovery snapshot.

14. The system of claim 13, wherein marking dirty sector indicators comprises identifying replacement source data for each dirty sector as one of an entry in the journal and a corresponding sector in the identified snapshot.

* * * * *